US009797761B2

(12) United States Patent
Vander Horst

(10) Patent No.: US 9,797,761 B2
(45) Date of Patent: Oct. 24, 2017

(54) RECREATIONAL VEHICLE WASTEWATER TANK MEASUREMENT SYSTEM AND METHOD

(71) Applicant: John Vander Horst, Littleton, CO (US)

(72) Inventor: John Vander Horst, Littleton, CO (US)

( * ) Notice: Subject to any disclaimer, the term of this patent is extended or adjusted under 35 U.S.C. 154(b) by 0 days.

(21) Appl. No.: 14/756,301

(22) Filed: Aug. 24, 2015

(65) Prior Publication Data

US 2017/0059385 A1    Mar. 2, 2017

(51) Int. Cl.
| | | |
|---|---|---|
| G01F 23/14 | (2006.01) |
| B60R 15/00 | (2006.01) |
| G01F 23/00 | (2006.01) |
| G01F 23/02 | (2006.01) |
| G01L 7/20 | (2006.01) |
| G01L 7/18 | (2006.01) |

(52) U.S. Cl.
CPC ............ *G01F 23/14* (2013.01); *B60R 15/00* (2013.01); *G01F 23/0046* (2013.01); *G01F 23/02* (2013.01); *G01L 7/18* (2013.01); *G01L 7/20* (2013.01)

(58) Field of Classification Search
CPC ........ G01F 23/02; G01F 23/14; G01F 23/162; G01L 7/086; G01L 7/18; G01L 7/185; G01L 7/187
See application file for complete search history.

(56) References Cited

U.S. PATENT DOCUMENTS

| | | | | |
|---|---|---|---|---|
| 3,141,333 | A | * | 7/1964 | Lester .................... G01F 23/16 73/299 |
| 3,333,814 | A | | 8/1967 | Sargent |
| 4,454,759 | A | * | 6/1984 | Pirkle .................... G01F 23/02 116/276 |
| 4,974,899 | A | | 12/1990 | Sargent |
| 5,052,224 | A | * | 10/1991 | Ford ...................... G01F 23/02 137/377 |
| 5,667,251 | A | | 9/1997 | Prest |
| 5,678,802 | A | | 10/1997 | Lunder |
| 7,389,688 | B1 | | 6/2008 | Vander Horst |
| 7,784,353 | B1 | * | 8/2010 | Feldmeier ........... G01L 19/0023 73/744 |
| 8,656,963 | B2 | | 2/2014 | Stegall |
| 2014/0083185 | A1 | | 3/2014 | Vander Horst |

* cited by examiner

*Primary Examiner* — Jill Culler
*Assistant Examiner* — Quang X Nguyen

(57) ABSTRACT

A liquid level measurement device and method for a wastewater tank or tanks in a recreational vehicle may be implemented by attaching a visual liquid level measuring module (such as a liquid level sight or a mechanical pressure gage) to the inlet of a gate valve that is configured for attachment to the outlet of a recreational vehicle wastewater dump system. The visual liquid level measuring module is configured to entirely fit inboard of the sidewalls of the recreational vehicle and underneath the floor of the recreational vehicle. The liquid level of the wastewater tank may be measured by (a) closing the gate valve, (b) opening a shutoff valve upstream of the gate valve but downstream of the wastewater tank, and (c) reading the level of the liquid indicated by the visual liquid level indicating device.

19 Claims, 9 Drawing Sheets

(Mechanical pressure gage above wastewater tank floor)

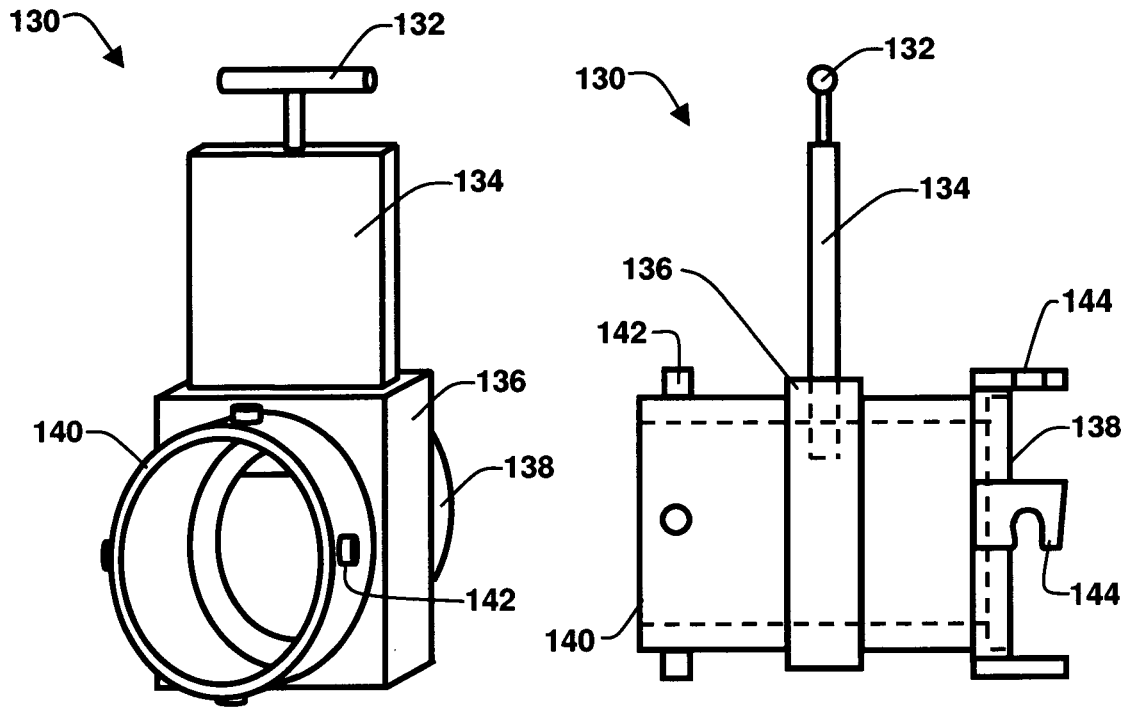
FIG. 3A
(Prior art
Isometric view)
FIG. 3B
(Prior art
Gate open)
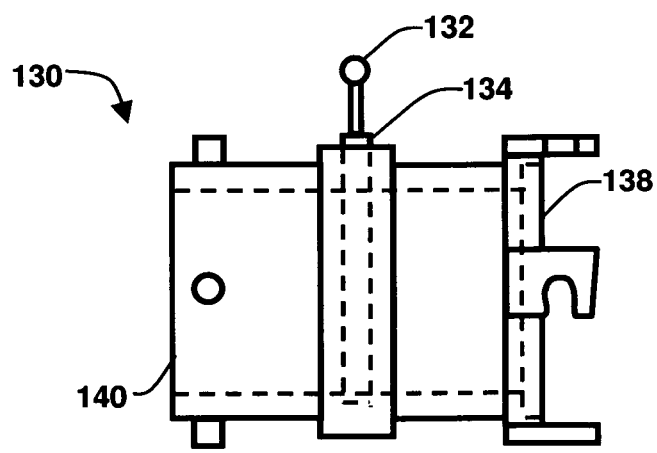
FIG. 3C
(Prior art
Gate closed)

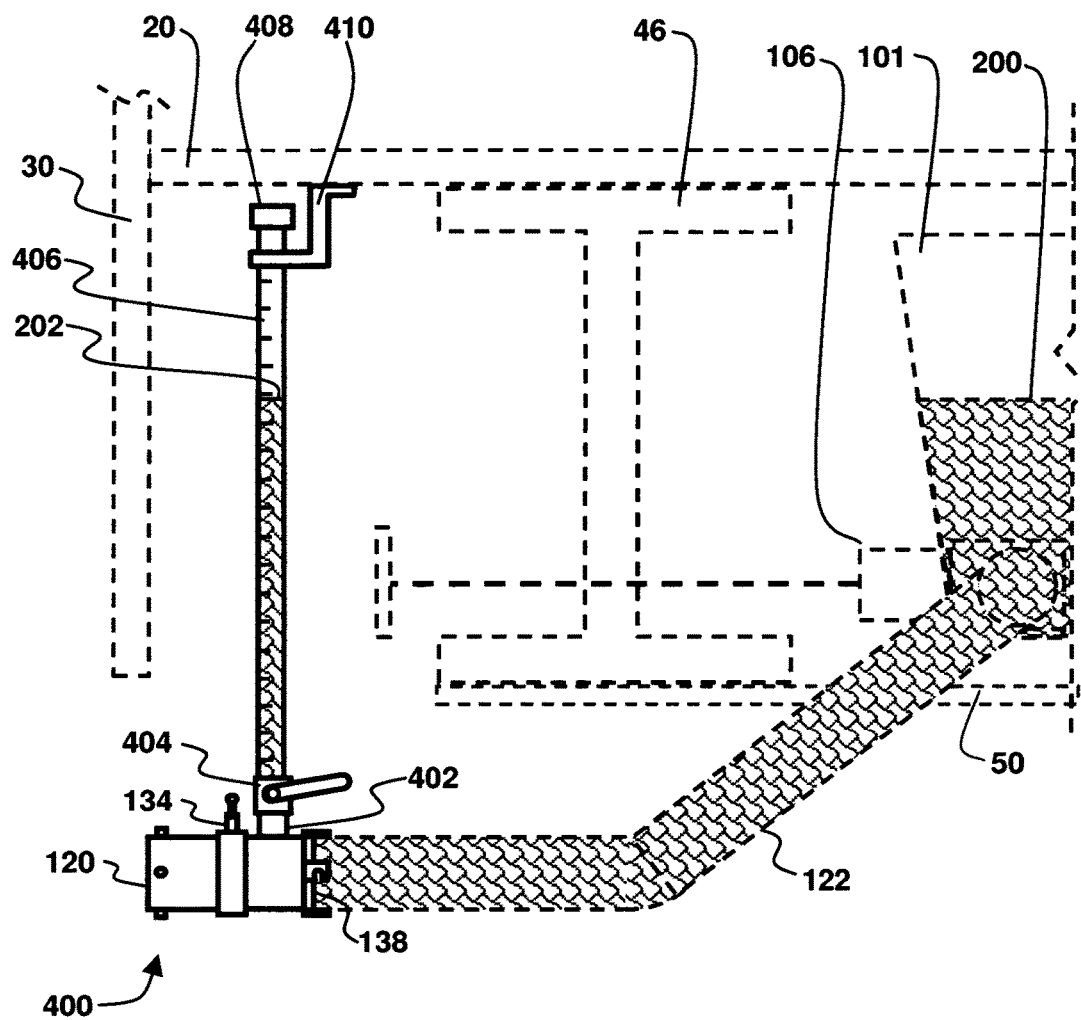
FIG. 4 (Liquid level sight installed in removable gate valve)

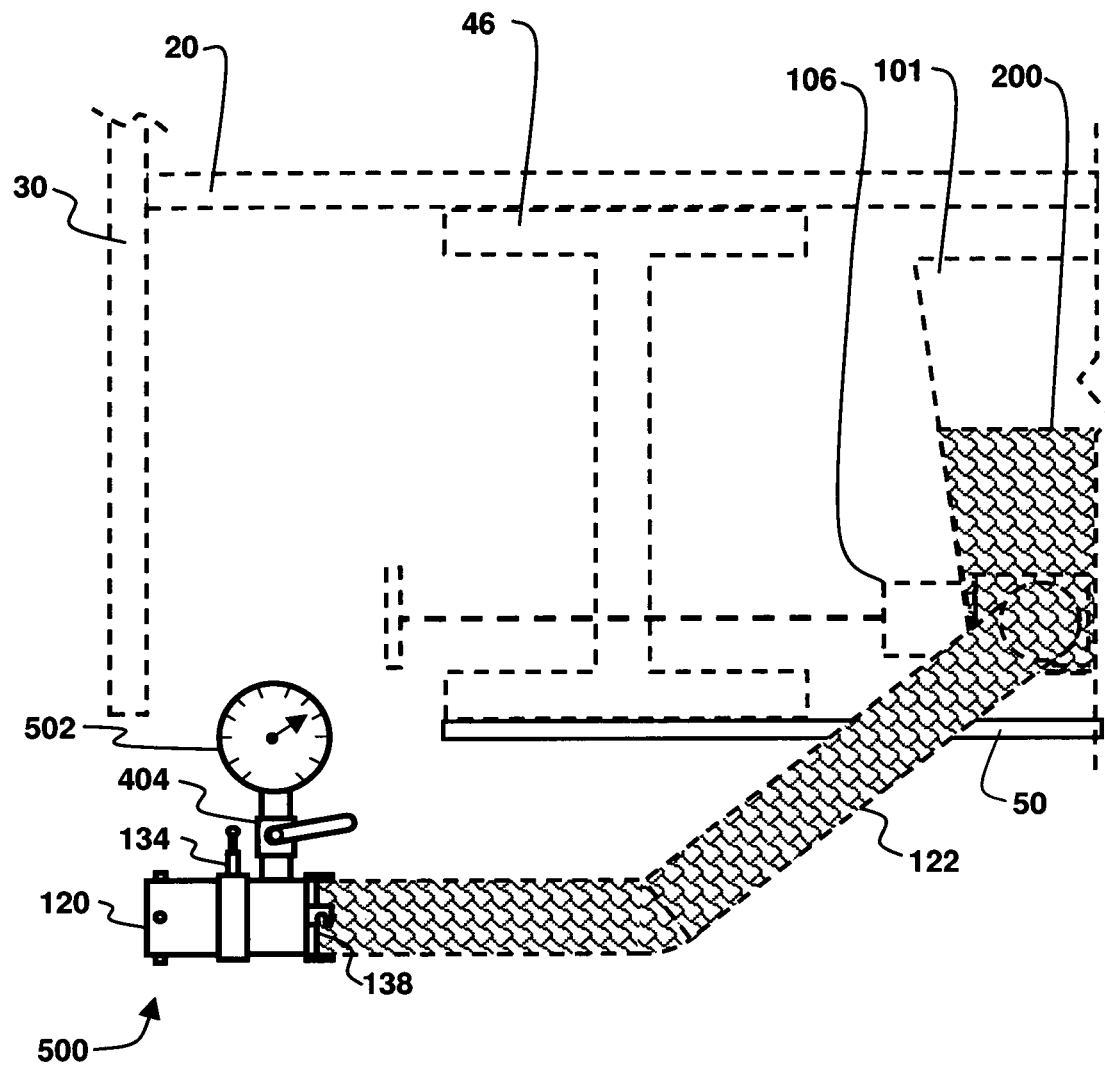
FIG. 5 (Mechanical pressure gage installed in gate valve)

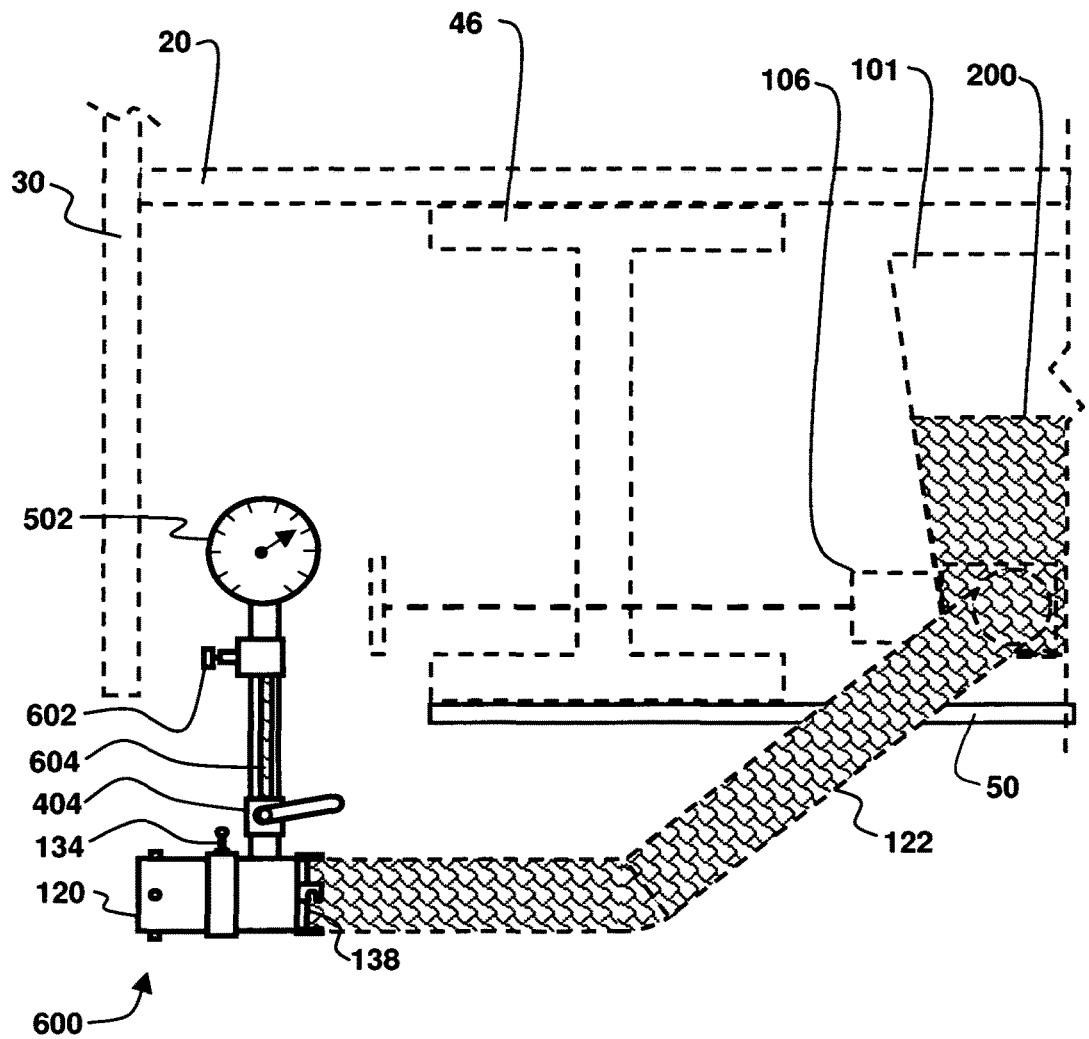
FIG. 6 (Mechanical pressure gage above wastewater tank floor)

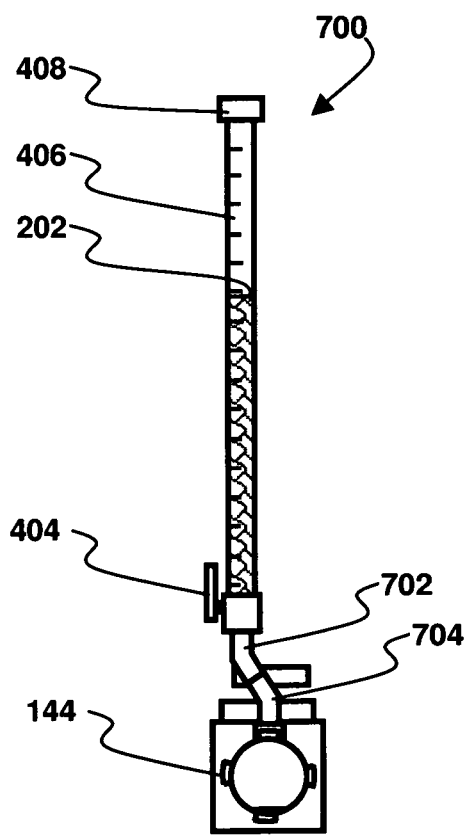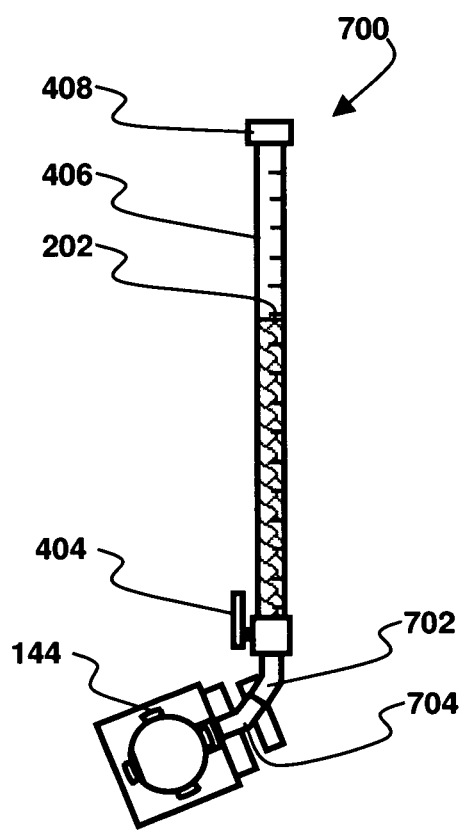
FIG. 7A
(Angle adjustment fittings in first position)
FIG. 7B
(Angle adjustment fittings in second position)

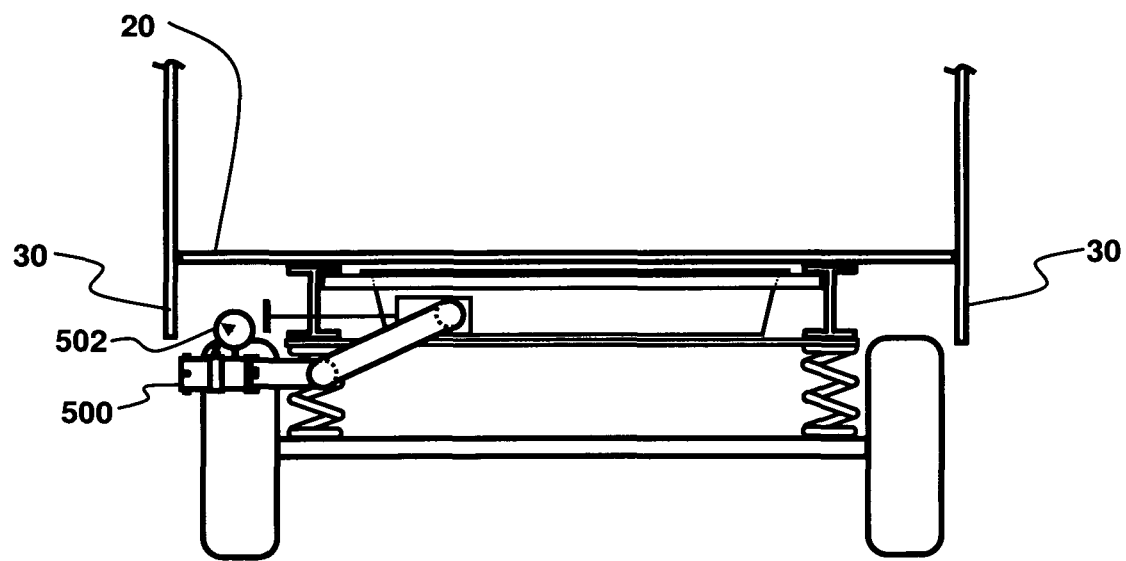
FIG. 8 (Gate valve with device installed in recreational vehicle)

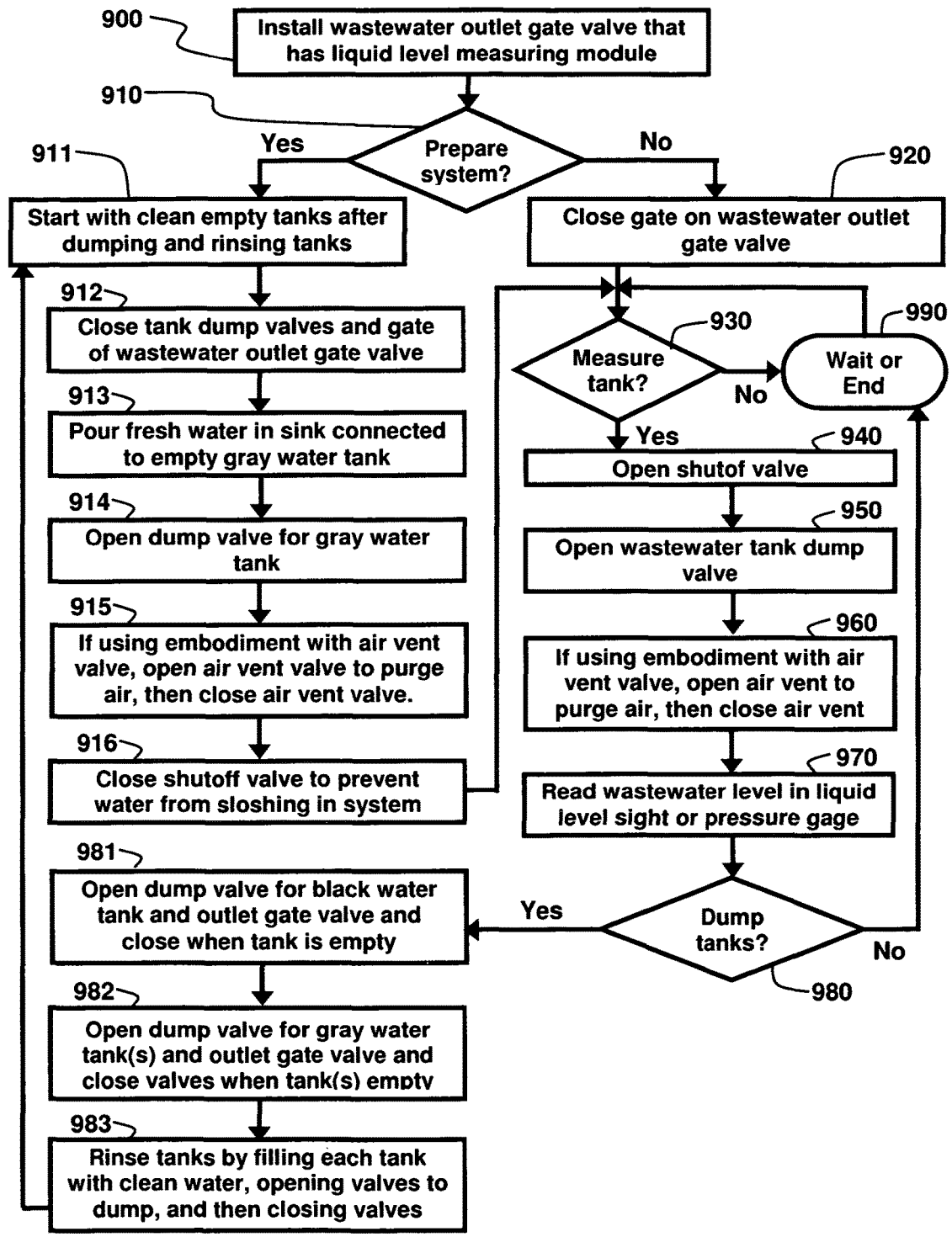
FIG. 9 (Recreational vehicle wastewater tank measurement method)

RECREATIONAL VEHICLE WASTEWATER TANK MEASUREMENT SYSTEM AND METHOD

BACKGROUND

This disclosure relates to the measurement of liquid levels in recreational vehicle wastewater holding tanks.

Many recreational vehicles (such as campers, trailers, fifth wheelers, and motor homes) have one or more tanks for storing the effluent or wastewater originating in the toilet, sink, or shower. These tanks are typically called black water or gray water tanks. The effluent stored in black water and gray water tanks can easily clog or render inoperable a liquid level measurement apparatus or sensors that are inside or attached directly to the tank and in direct contact with the wastewater. Examples of typical in-tank direct wastewater measurement devices are ones that use conductance, capacitance, floats, or other direct means for measuring the liquid level. Despite the numerous cleaning methods and chemicals that have been developed, many of the existing wastewater level measuring methods and systems can fail within several weeks, resulting in the owner of a recreational vehicle draining the wastewater tank or tanks too frequently or running the risk of a tank overflow.

Modern recreational vehicles often have a plurality of wastewater holding tanks. There are normally separate tanks for black water (human waste from the toilet) and gray water (waste water from the kitchen sink and/or shower). There may be a second gray water tank for effluent specifically from a shower. Recreational vehicles also have one or more fresh water tanks. The black water, gray water, and freshwater tanks are typically located under the floor of the recreational vehicle and between the I-beam supports that run longitudinally under the floor of the vehicle from the front to the back. In newer recreational vehicles, the tanks are often insulated from the outside environment, making it difficult to access the tanks and difficult to access and replace any failed or fouled liquid level sensors installed in or on the tanks.

A system and method for measuring the level of liquid in a recreational vehicle tank that does not require physical access to the recreational vehicle tank or tanks is desired. The system or method should not be located on or in the wastewater tank. In the aftermarket, it is desirable if the system is user installable (and detachable) and doesn't require special tools.

BRIEF DESCRIPTION OF THE DRAWINGS

The present disclosure is described in conjunction with the appended figures in which:

FIG. 3A shows an isometric view of a prior art removable gate valve for a recreational vehicle dump hose coupling;

FIG. 3B shows a side view of the prior art removable gate valve when the gate is open;

FIG. 3C shows a side view of the prior art removable gate valve when the gate is closed;

FIG. 4 shows a liquid level sight installed in the removable gage valve;

FIG. 5 shows a mechanical pressure gage installed in the removable gate valve;

FIG. 6 shows a mechanical pressure gage installed above the elevation of the wastewater tank floor;

FIG. 7A shows a liquid level measuring device having two angled adjustment fittings in a first position;

FIG. 7B shows a liquid level measuring device having two angled adjustment fittings in a second position;

FIG. 8 shows the gate valve with a liquid level measuring device installed in the recreational vehicle; and FIG. 9 shows a method for using the system shown in FIG. 4, FIG. 5, and FIG. 6.

Figure 1A:
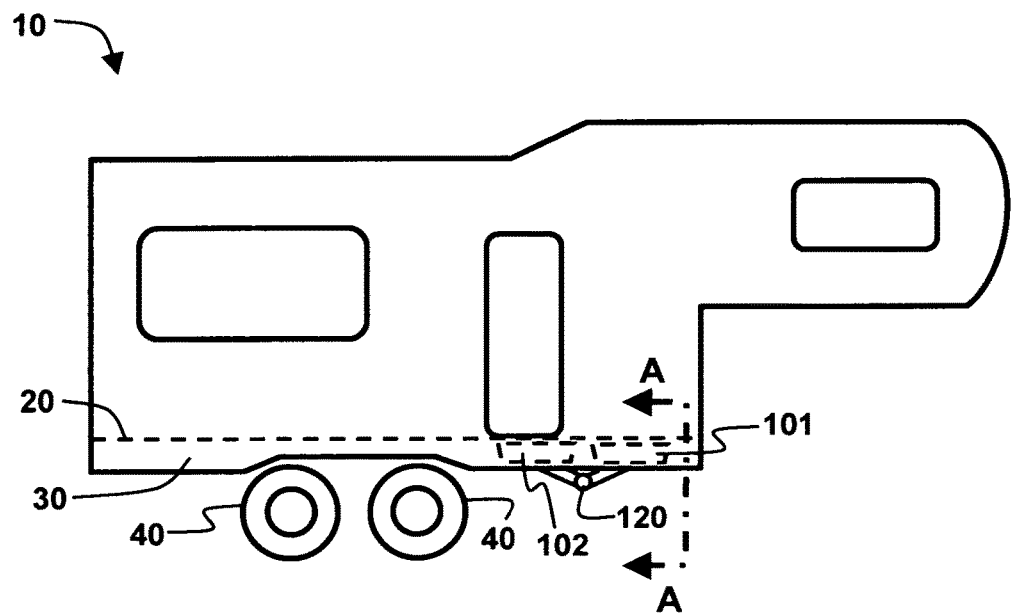
FIG. 1A shows a side view of a fifth wheel trailer recreational vehicle.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In one embodiment, the present disclosure provides as system or method suitable for use with one or more wastewater holding tanks of a recreational vehicle. Wastewater holding tanks are typically located below a toilet, sink, shower, or any other place where water is used in a recreational vehicle or similar application. Most commonly, the wastewater tanks are underneath the floor of the recreational vehicle. In addition to recreational vehicles, vehicle wastewater holding tanks can be used in other transportable or moving applications such as boats, trains, buses, aircraft, or portable lavatories.

This disclosure discusses transducers and the fact that embodiments of the present invention can be made without using a transducer (i.e. transducer-less). For purposes of this disclosure, a transducer is defined as a device that converts one form of energy to another, where energy types include electrical, mechanical, electromagnetic (including light), chemical, acoustic, or thermal energy. Therefore, an example of a transducer-less device would be one that does not rely on any conversion from mechanical energy to electrical, electromagnetic, chemical, acoustic, or thermal energy. A mechanical pressure gage and a liquid level sight gage (or glass, or window) would be examples of transducerless devices.

One embodiment of the present invention relies on the principle that the height of a liquid in a tank can be measured at a distance from such tank by measuring the height of a liquid that is in communication with the liquid in the tank. This principle is understood in the prior art and is being applied to recreational vehicle tanks in embodiments of the present invention. This principle allows the height of the liquid to be measured by a device that is remote, and not attached to, in, or on a wastewater tank.

FIG. 1A shows a side view of a fifth wheel trailer recreational vehicle. A fifth wheel trailer is one example of a recreational vehicle. Other examples of recreational vehicles include, but are not limited to, travel trailers that use a ball hitch, motor homes, campers, and/or any other device for transporting humans or goods, that has living space and/or amenities found in a home. Referring to FIG. 1A, the recreational vehicle shown at 10, has a floor shown by the dotted (hidden) line at 20. A sidewall skirt 30 extends below the floor 20. The vehicle 10 has wheels, shown at 40. In this particular example of a recreational vehicle 10, there are two wastewater tanks, shown at 101 and 102, that are located under the floor 20 of the recreational vehicle. These wastewater tanks are connected to a wastewater outlet, shown at 120. The wastewater outlet 120 is part of the dump system of the recreational vehicle. This outlet 120 typically has a fitting that can be used to attach a hose or other fittings so that the wastewater tanks, 101 and 102, can be emptied with a minimum of spillage and hassle. One of the most common dump fittings is a set of four bosses (or protrusions) that extend radially from the outside diameter of the cylindrical outlet 120. These bosses can also be referred to as "dogs" or "protrusions" and may be in the shape of round radial pins, or any other shape that extends out radially from the outside of the cylindrical outlet 120. These bosses of the dump fitting are designed to allow any device that has a bayonet coupling (or receptor, or receptors) of the right size and shape to easily attach to the dump fitting. It should be noted that there can be any quantity of radial bosses (or similar protrusions) on the cylindrical outlet. For example, there can be one radial boss, there can be two radial bosses, there can be three radial bosses, there can be four radial bosses, there can be more than four radial bosses. Similarly the device that attaches to these bosses can have one bayonet receptor, it can have two bayonet receptors, it can have three bayonet receptors, it can have four bayonet receptors, it can have more than four bayonet receptors. Furthermore, the number of radial bosses does not have to equal the number of bayonet receptors.

Figure 1B:
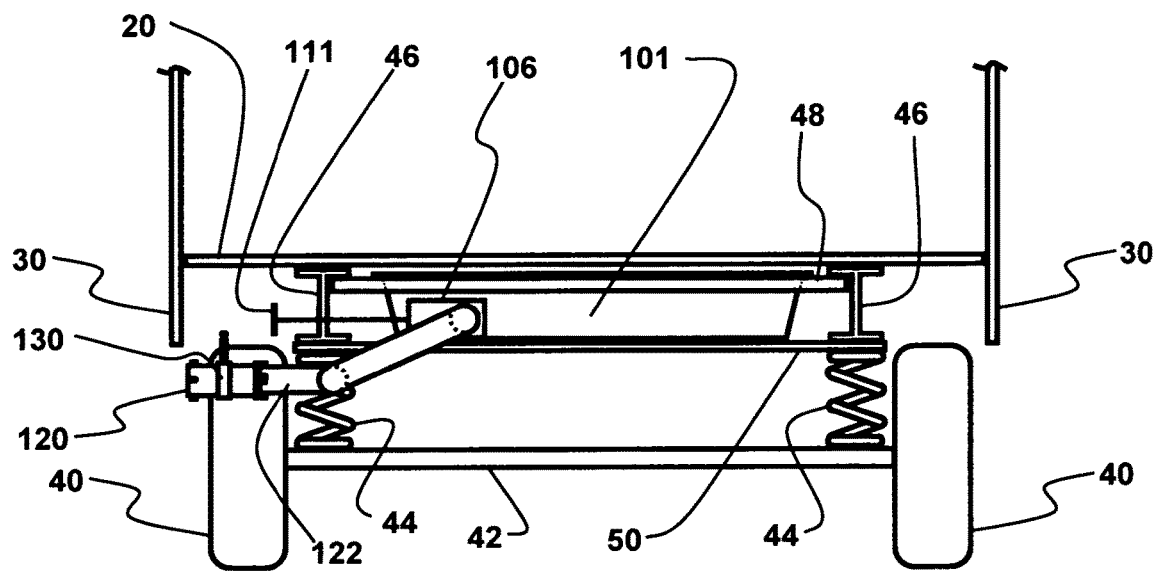
FIG. 1B is section A-A of FIG. 1A, which shows the typical location of the wastewater tanks in the recreational vehicle.

FIG. 1B is section A-A of FIG. 1A. FIG. 1B provides another view of the location of the wastewater tanks in a typical recreational vehicle. Referring to FIG. 1B, the floor of the recreational vehicle is shown at 20. The sidewalls of the recreational vehicle are shown at 30 and the wheels are shown at 40. The wheels are connected to each other by an axle, shown at 42. Underneath the living space of a typical recreational vehicle there are a pair of I-beams that run longitudinally from the front to the back of the recreational vehicles, shown as a section view at 46. The I-beams 46 are connected to the axle 42 by means of a suspension system, which normally includes springs, shown at 44. Although FIG. 1B shows coil springs 44, because they are easier to visualize in this view, most recreational vehicles have leaf springs to perform this suspension function. The floor 20 rests on the I-beams 46 and the sidewalls 30 are attached to the floor. Typically, the sidewalls 30 extend below the floor 20 as shown in FIG. 1B. The space under the floor 20 and inboard of the sidewalls can be used for a variety of purposes in a motor vehicle. For, example, this is typically where the wastewater tanks (one example of which is shown at 101) are installed because it makes it easy for water to drain down from the places where the water is used in the living space of the recreational vehicle.

Figure 2:
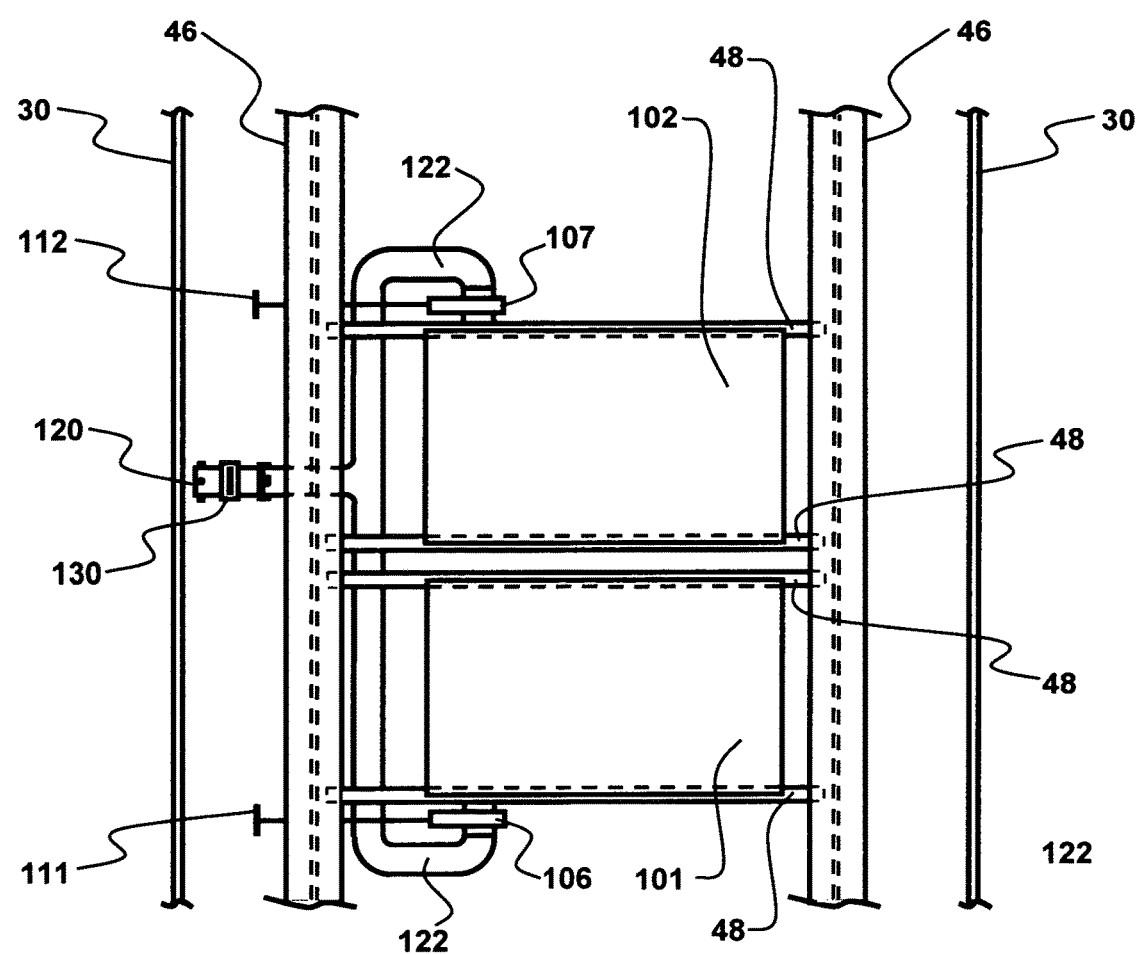
FIG. 2 shows a top view of the tanks when the floor of the recreational vehicle is not installed.

FIG. 2 shows a top view of the wastewater tanks when the floor of the recreational vehicle is not installed. Referring to FIG. 2 and further referring to FIG. 1B, the wastewater tank (or tanks) shown at 101 and 102 are typically mounted between the I-beams 46. The wastewater tanks 101 and 102 typically have a lip near the top, having typically been made of thermoplastic top and bottom sections that are bonded together. In many recreational vehicles, this lip of the wastewater tank (or tanks) 101 and 102, is supported by angle iron, shown at 48, that is welded to the underside of the top flange of the I-beams 46. In many recently-built recreational vehicles, there is a thermal insulation plate 50 mounted beneath the wastewater tanks 101 and 102, that provides some amount of insulation to prevent the wastewater tanks 101 and 102, from freezing when the outside temperatures are low. This thermal insulation plate 50, and other insulation that may be added to the bottom of the recreational vehicle in the area below and surrounding the wastewater tanks 101 and 102, makes it difficult for an owner or mechanic to access the wastewater tanks 101 and 102, once the recreational vehicle has been assembled.

Further referring to FIG. 1B and FIG. 2, the wastewater tanks 101 and 102, typically have dump valves at their outlets as shown at 106 and 107. These dump valves 106 and 107 are often technically considered to be gate valves as well. The dump valves 106 and 107 can be opened or closed by a user through the use of handles, shown at 111 and 112 that are accessible underneath the floor 20 of the recreational vehicle or at some other location through the use of linkages between the handles 111 and 112, and dump valves 106 and 107. A connecting pipe 122 leads from these dump valves 106 and 107, to the outlet of the wastewater system, shown at 120. The outlet 120 can have a variety of configurations. In some cases, the connecting pipe 122 simply ends and there is nothing further in the system. In this configuration, where the end of the connecting pipe 122 is the outlet of the wastewater system, the connecting pipe 122, typically has some radial bosses (pins) at the end that can be used as a dump fitting for attachment of other items to the outlet 120. For example, those radial bosses (pins) could be used to attach a cap (not shown). In the configuration shown in FIG. 1B and FIG. 2, there is a gate valve, shown at 130, attached to the radial bosses (pins) of the connecting pipe by means of a bayonet fitting. Note that it is also possible for the end of the connecting pipe 122 to have no radial bosses and instead to be simply a straight cylindrical connection. It is possible for the end of the connecting pipe 120 to have any type of plumbing connection capable of being understood by anyone skilled in the art including, but not limited to clamp fittings, threaded fittings, gasket fittings, bonded fittings, welded fittings, and compression fittings.

FIG. 3A shows an isometric view of a prior art removable gate valve 130 for attachment to a dump fitting (also known as an outlet 120 in FIG. 1A) of a recreational vehicle. FIG. 3B shows a side view of the prior art removable gate valve 130 when the gate is open. FIG. 3C shows a side view of the prior art removable gate valve 130 when the gate is closed. Referring to FIG. 3A, FIG. 3B, and FIG. 3C, the gate valve 130 comprises an actuator in the form of a handle shown at 132, a slideable gate shown at 134, a body shown at 136, an inlet shown at 138, and an outlet shown at 140. Note that the handle 132 can be any actuator capable of being understood by anyone skilled in the art. The handle 132 can be of any shape. The handle can be connected to the rest of the gate valve in any way cable of being understood by anyone skilled in the art including, but not limited to rigid linkages, push-pull cables, electromechanical actuators, and hydro-mechanical actuators. The slideable gate 134 sits between the inlet 138 and outlet 140 and allows the user to open and close the fluid connection between the inlet 138 and outlet 140 by moving the actuator handle 132. By comparing the position of the actuator handle 132 and the gate 134, between FIG. 3B and FIG. 3C one can see how a gate valve operates by either opening a passage between the gate valve inlet 138 and the gate valve outlet 140 or closing it.

Further referring to FIG. 3A, FIG. 3B, and FIG. 3C, the gate valve outlet 140 typically has four radial bosses, shown at 142 that can be used for attaching something to the gate valve outlet 140. These bosses 142 can also be referred to as "dogs" or "protrusions" and may be in the shape of round radial pins, or any other shape that extends out radially from the outside of the cylindrical outlet 120. The gate valve inlet 138 typically has four slotted bayonet receptors, shown at 144, designed for user attachment and detachment of the gate valve 130 to a connecting pipe (122 in FIG. 1B and FIG. 2) through the use of the radial bosses (typically the same size and shape) that are located on the connecting pipe outlet. The end of the connecting pipe 122, to which the gate valve 130 is attached, is also know as the dump fitting or outlet (120 in FIG. 1A). It should be noted that there can be any quantity of radial bosses (or similar protrusions) on the outlet of the gate valve 130. For example, there can be one radial boss, there can be two radial bosses, there can be three radial bosses, there can be four radial bosses, and there can be more than four radial bosses. Similarly, there can be any quantity of bayonet receptors on the inlet of the gate valve 130. For example, there can be one bayonet receptor, there can be two bayonet receptors, there can be three bayonet receptors, there can be four bayonet receptors, and there can be more than four bayonet receptors. Furthermore, the number of radial bosses on the gate valve 130 does not need to be the same as the number of bayonet receptors on the gate valve 130. It is further possible for the gate valve inlet 138 and the gate valve outlet 140 to have any type of plumbing connection capable of being understood by anyone skilled in the art including, but not limited to clamp fittings, threaded fittings, gasket fittings, bonded fittings, welded fittings, and compression fittings.

The gate valve shown in FIGS. 3A, 3B, and 3C, and the liquid level measuring apparatus embodiments shown in FIGS. 4, 5, and 6 have four bayonet receptors equally spaced at 90 degrees around the periphery of the inlet. These bayonet receptors are at the top, bottom, and both sides of the inlet. The bayonet receptors are configured for engagement with the four radial bosses of the outlet of the connecting pipe, shown at 122 in FIGS. 4, 5, and 6. It can be understood from these drawings that attachment and detachment of the liquid level measuring apparatus (400 in FIG. 4, 500 in FIG. 5, or 600 in FIG. 6) is accomplished in a manual tool-free manner by a rotation of no more than 90 degrees of the apparatus relative to the outlet of the recreational vehicle wastewater tanks (122 in FIG. 4, FIG. 5, and FIG. 6).

The information shown in FIGS. 1A, 1B, 2, 3A, 3B, and 3C is the prior art. It also illustrates that the wastewater tanks 101 and 102 can be difficult and expensive to access because they are in an area that is surrounded by beams and insulation. Thus, if one or more of the level sensors located in the walls of the wastewater tank becomes inoperable, there is no simple way to replace it. As a result, an entire cottage industry has developed around (a) ways of cleaning the wastewater tanks using chemicals and vibration (b) developing tank-mounted level sensors that are less likely to stop working due to fouling, and (c) various indirect ways of measuring the level of liquid in the wastewater tanks when the factory-installed probes no longer work. The information provided in FIGS. 4, 5, 6, 7A, 7B, and 8 shows some simple, effective, systems and methods that can measure the levels of multiple wastewater tanks without needing to physically access the wastewater tank or tanks.

FIG. 4 shows an embodiment of a user-installable system and method for measuring the liquid level of a wastewater tank 101 that can easily be adapted to the wastewater outlet 120 of a typical recreational vehicle. Referring to FIG. 4, the main components of the environment to which the device is being adapted are shown as dotted lines and include the floor 20, the sidewalls 30 (also known as sidewall skirts), the I-beam 46, the thermal insulation plate 50, the wastewater tank 101, and the connecting pipe 122. As mentioned previously, the outlet of the connecting pipe 122 typically has four radial bosses (pins). A wastewater outlet gate valve with a liquid level measuring module, shown in solid lines at 400 has been attached to these radial pins using the slotted bayonet receptors that were described and shown at 144 in FIG. 3B. Unlike the prior art gate valves, the embodiment shown at 400 in FIG. 4 includes a liquid level measuring module. The liquid level measuring module is mounted in the inlet region of the gate 134. In the embodiment shown in FIG. 4, the liquid level measuring module comprises a fitting 402, a shutoff valve 404, and a visual liquid level indicating device in the form of a liquid level sight 406. The fitting 402 is mounted in the inlet region of the gate 134. The fitting 402 is connected to the shutoff valve 404, which is connected to a liquid level sight 406. The fitting can be any type of fitting capable of being understood by anyone skilled in the art including, but not limited to clamp fittings, threaded fittings, gasket fittings, bonded fittings, welded fittings, and compression fittings. The liquid level measuring module can further comprise a vent cap 408 and a mounting bracket 410 for attachment of the liquid level sight tube 406 to the recreational vehicle. This location of the fitting 402 on the inlet side of the gate 134 ensures that the liquid level 202 in the liquid level sight 406 will be at the same elevation as the liquid level 200 in the wastewater tank 101 when the gate 134 of the wastewater outlet gate valve with liquid level sight 400 is closed and the wastewater tank gate valve 106 is open. Thus, by placing the visual liquid level indicating device in this location and setting the gate 134 and dump valve 106 correctly, the visual liquid level indicating device becomes responsive to the liquid level of the fluid upstream of the gate 134. Note that in FIG. 4 the liquid is shown in the connecting pipe 122 to clarify that the wastewater tank valve is open. There will also be liquid inside the wastewater outlet gate valve 400 on the right side of the gate 134, but none on the left side because the gate 134 is closed. The liquid will rise in the liquid level sight tube 406 to provide a visual indication of the level of liquid (i.e. fullness) in the wastewater tank 101.

Further referring to FIG. 4 the visual liquid level indicating device 406 can be of any type or configuration capable of being understood by anyone skilled in the art. It can be a sight tube. It can be a sight glass. It can be a flat window. It can be a curved window. It can be cylindrical, a pipe, a conduit, a line, a flue, a hose, a funnel, a duct. It can be oval. It can be conical. It can be pyramidal. It can be spherical. It can be rigid or flexible. It can be any other shape. It can be completely transparent or translucent. It can be transparent or translucent in only one section. For purposes of this disclosure the term "liquid level sight" will be used to encompass flat windows, curved windows, tubes, sight glasses, and any other partially or completely transparent or translucent material that provides visual information of the height of a liquid. In one embodiment, the visual liquid level indicating device 406 is made from rigid clear ¼ inch schedule 80 polyvinyl chloride (PVC) piping (tubing) that has horizontal lines marked on it to show different liquid levels relative the levels of liquid in the wastewater tank or tanks. Furthermore, the sight tube, sight glass, or window could have an optical sensor that senses an optical property to transmit a signal responsive to the level of liquid in the sight tube, sight glass, window, or similar visually-oriented direct liquid level indicating device.

The wastewater outlet gate valve with liquid level sight shown at 400 in FIG. 4 can be configured and can operate without the fitting, 402, the shutoff valve 404, the vent cap 408, and/or the bracket 410. The benefit of the shutoff valve 404 is that shutting it prevents excess liquid from sloshing in the sight tube 406 when the vehicle is moving. The benefit of the vent cap 408 is that it dampens the oscillations of the liquid in the vent tube 406. The benefit of the bracket 410 is that it makes the system more rigid during vibrations. It should also be noted that in the configuration shown in FIG. 4, the entire liquid level measuring module (comprising the fitting 402, the shutoff valve 404, the visual liquid level indicating device 406, the vent cap 408, and the bracket 410) fit underneath the floor 20 of the recreational vehicle and inboard of the sidewalls 30.

It should be noted that embodiments of the present invention do not necessarily need to be user attachable and detachable. For example, the system and method described could be permanently attached at the factory by fusing, bonding (cementing, using an adhesive), welding or otherwise permanently attaching a gate valve with a liquid level measuring module configured for mounting under the floor of a recreational vehicle and inboard of the sidewalls of the recreational vehicle. The gate valve with liquid level measuring module could also be detachably attached using something other than a bayonet coupling, by using any type of plumbing connection capable of being understood by anyone skilled in the art including, but not limited to clamp fittings, threaded fittings, gasket fittings, and compression fittings.

The system shown in FIG. 4 can be adapted for use with a mechanical pressure gage and assembled as shown at 500 in FIG. 5. The environment shown in FIG. 5 is the same as what was shown in FIG. 4. The primary difference between the sight tube embodiment 400 and the pressure gage embodiment 500 is that the pressure gage embodiment 500 uses a pressure gage, shown at 502 in FIG. 5 instead of the visual liquid level sight 406 in FIG. 4. The pressure gage 502 can be any type of mechanical pressure gage or pressure transducer capable of being understood by anyone skilled in the art. The gage shown in FIG. 5 is a rotary dial gage 502, that shows pressure in inches of water (H2O). The rotary dial on a mechanical pressure gages can be actuated by the movement of a bourdon tube, the movement of a bellows, or the movement of a diaphragm. Because of the low pressures (typically less than 24 inches of water) involved, a rotary dial that is mechanically actuated as a result of the movement of a diaphragm is typically used because diaphragms can be configured to have a high sensitivity at low pressure levels (i.e. a low number of inches of water). However, other types of pressure gages could be used and the same measurement could be performed with other pressure measuring devices such as manometers, pressure sensors, and pressure transducers.

The system shown in FIG. 5 can further be adapted by moving the pressure gage 502 up to a point where the bottom of the pressure gage 502 is at about the same elevation as the floor of the wastewater tank as shown in FIG. 6. The environment shown in FIG. 6 is the same as what was shown in FIG. 4 and FIG. 5. The primary difference between the pressure gage embodiment 500 in FIG. 5 and the alternate pressure gage embodiment 600 in FIG. 6 is that there is an elevation change between the shutoff valve 404 and the pressure gage 502. This elevation change comprises a sight glass 604 and an air vent valve 602. The air vent valve 602 has been provided so that the liquid can rise to level that is roughly equivalent to the floor of the wastewater tank 101. The benefit of having the liquid rise to this level is that the full scale of the pressure valve 502 can then be used to determine the fill level of the wastewater tank. The sight glass 604, which is optional, can be beneficial in helping the user see that liquid has risen up the tube to the elevation of the air vent valve 602 and that further venting is unnecessary. Note that the sight glass 604 can be any window or partially or completely clear or translucent device that helps to show the liquid level as it rises toward the air vent valve 602. Note also that the air vent valve 602 and/or the sight glass 604 could also be used in conjunction with the embodiment shown in FIG. 4 or any other embodiment or configuration capable of being understood by anyone skilled in the art.

The following is a list of the steps and sequence to follow when using the system shown in FIG. 4, FIG. 5, and FIG. 6. This method is also illustrated in FIG. 9.

Step 900. Install the wastewater outlet gate valve with liquid level measuring module (either 400 in FIG. 4, or 500 in FIG. 5, or 600 in FIG. 6) onto the wastewater outlet (120 in FIG. 1A or end of 122 in FIG. 1B, FIG. 2, FIG. 4, FIG. 5, or FIG. 6) of a recreational vehicle.

Step 920. Close the gate (134 in FIG. 4, FIG. 5 or FIG. 6) on the wastewater outlet gate valve with liquid level measuring module that has been installed. (400 in FIG. 4, or 500 in FIG. 5, or 600 in FIG. 6).

Step 930. Decide when you want to measure one or more of the tanks.

Step 940. Open the shutoff valve (404 in FIG. 4, FIG. 5, or FIG. 6) on the liquid level measuring module.

Step 950. Open the wastewater tank dump valve for the tank to be measured (106 in FIG. 4, FIG. 5, or FIG. 6).

Step 960. If using an embodiment with an air vent valve (such as that shown in FIG. 6), open the air vent valve (602 in FIG. 6) until the liquid has risen up the sight glass (604 in FIG. 6), or until water starts coming out of the air vent valve if no sight glass is present, and then close the air vent valve (602. in FIG. 6).

Step 970. Read the level of the liquid in the liquid level sight (406 for the embodiment shown in FIG. 4) or the pressure gage (502 for the embodiment shown in FIG. 5 or FIG. 6.).

As a further refinement of the method described above, the decision box shown at 910 in FIG. 9 shows that one can choose to prepare the system by filling the connecting pipe (122 in FIG. 4, FIG. 5, or FIG. 6) with water that is as clean as possible by performing the following sequence of steps after the waste water outlet gate valve with liquid level measuring module has been installed (Step 1 in the list above) or after the tanks have been dumped:

Step 911. Start with clean empty tanks after dumping and rinsing the tanks.

Step 912. Close the first wastewater tank dump valve (106 in FIG. 2), the second wastewater dump valve (107 in FIG. 2) and the gate of the wastewater outlet gate valve (134 in FIG. 4, FIG. 5, and FIG. 6).

Step 913. Pour approximately 2 gallons of fresh water into a sink that is connected to the empty gray water tank (assumed to be tank 101 in FIG. 2 in this example).

Step 914. Open the first wastewater tank dump valve (106 in FIG. 2), which corresponds to the dump valve for the gray water tank if the gray water tank is assumed to be 101 in FIG. 2.

Step 915. If using an embodiment with an air vent valve (such as that shown in FIG. 6), open the air vent valve (602 in FIG. 6) until the liquid has risen up the sight glass (604 in FIG. 6), or until water starts coming out of the air vent valve if no sight glass is present, and then close the air vent valve (602. in FIG. 6).

Step 916. Close the shutoff valve (404 in FIG. 4, FIG. 5 and FIG. 6), if desired, to prevent water from sloshing in the system while the vehicle is being driven.

Having performed Steps 2a through 2f to prepare the system, the process for checking the level of a tank then becomes the same as what was described in Steps 3-7 above.

If any tank is full enough that it needs to be dumped (a decision shown as 980 in FIG. 9), the process is:

Step 981. Dump the liquid from black water tank (for example tank 102 in FIG. 2) by opening its dump valve (107 in FIG. 2 in this example), and opening the gate (134 in FIG. 4, FIG. 5, or FIG. 6) of the outlet gate valve. Close all valves when the black tank is empty.

Step 981. Dump the liquid from gray water tank(s) (for example tank 102 in FIG. 2) by opening its dump valve (106 in FIG. 2, FIG. 4, FIG. 5, and FIG. 6 in this example), and opening the gate (134 in FIG. 4, FIG. 5, or FIG. 6) of the outlet gate valve. Close all valves when the gray water tank(s) is/are empty.

Step 983. Rinse the tanks if so, equipped. When rinsing, clean water is added to a tank (along with cleaning chemicals in some cases) and the dump valve to that tank is opened, along with the gate (134 in FIG. 4, FIG. 5, or FIG. 6) of the outlet gate valve. The process is repeated for each tank. Just like when dumping initially, it is best to start with the black water tank and then do the gray water tank(s). When finished rinsing the tanks, one can follow steps 912 to 916 to fill the connecting pipe (122 in FIG. 4, FIG. 5, and FIG. 6) with clean water.

As shown by step 990 in FIG. 9, one waits or ends the process if a tank does not need to be measured.

FIG. 7A and FIG. 7B show a liquid level measuring device having two angled adjustment fittings at 700. In FIG. 7A the two angled adjustment fittings, shown at 702 and 704 are in a first position. In and FIG. 7B the two angled adjustment fittings 702 and 704 are in a second position. Each of the two angled adjustment fittings 702 and 704 have an outlet that goes out at an angle that is different than the angle at which the inlet comes in. This angular difference from a straight (180 degree) fitting can be called the "bend" of the angled adjustment fitting 702 or 704. Although the angled adjustment fittings 702 and 704 are shown with a device that uses a liquid level sight tube 406, it should be noted that this configuration should also be used with a pressure gage, such as that shown at 502 in FIG. 5 and FIG. 6 or any other pressure measuring device capable of being understood by anyone skilled in the art. The benefit of the angled adjustment fitting 702 and 704 can be understood by comparing FIG. 7A with FIG. 7B. There is no standard for the angle at which the four (or other number of) radial bosses are placed on a wastewater outlet of a recreational vehicle. Since it would be difficult to move the slotted bayonet receptors, shown at 144 in FIGS. 7A and 7B, the better approach is to provide a way to always be able to orient the sight tube or other level measuring device into a position close to vertical. With four equally spaced radial pins, the pins can be anywhere in the range from +45 degrees to −45 degrees from a normal North-South-East-West orientation. By having two angled adapters that each have at least a 22.5-degree difference in angles between their inlets and their outlets (i.e. at least a 22.5-degree bend) and can be rotated independently, the sight tube 406 can be placed vertically for any angle between +45 degrees and −45 degrees.

FIG. 8 shows the gate valve with a liquid level measuring device installed in the recreational vehicle. This shows that the liquid level measuring device 500 is under the floor 20 of the recreational vehicle and primarily, if not completely inboard of the sidewalls 30 of the recreational vehicle. In this particular case, the device shown uses a pressure gage 502, but this system and method described herein could work with any other liquid level measuring device or method capable of being understood by anyone skilled in the art, including the use of a sight tube or sight glass.

A number of variations and modifications of the disclosed embodiments can also be used. The principles described here can also be used for in applications other than recreational vehicles such as bioreactors, etc. While the principles of the disclosure have been described above in connection with specific apparatuses and methods, it is to be clearly understood that this description is made only by way of example and not as limitation on the scope of the disclosure.

What is claimed is:

1. A system for indicating the level of liquid in a recreational vehicle wastewater tank comprising:
    a user detachable liquid level measuring apparatus configured for removable attachment to a wastewater outlet downstream of a linearly slideable dump valve, wherein the dump valve is located downstream of the recreational vehicle wastewater tank, the user-detachable liquid level measuring apparatus further comprising:
    an inlet comprising at least one bayonet receptor;
    an outlet comprising at least one radial boss;
    a linearly slideable gate located between the inlet and the outlet;
    a handle for sliding the gate; and
    a liquid level measuring module, wherein:
        the liquid level measuring module connects to the top of the apparatus inlet at a location between the bayonet receptor and the linearly slideable gate;
        the liquid level measuring module comprises:
            a liquid level measuring device comprises a sight glass and a mechanical pressure gage, wherein the mechanical pressure gage comprising a rotary dial to indicate pressure in response to a wastewater liquid level of the recreational vehicle tank;
            an air vent valve wherein:
                the sight glass is located above a shutoff valve and between the shutoff valve and the air vent valve, and
                the air vent valve is located above the sight glass and between the sight glass and the mechanical pressure gage; and wherein:
the shutoff valve is located above the top of the apparatus inlet and below the measuring device;
the shutoff valve is configured for selectively preventing the flow of fluid between the apparatus inlet and the measuring device; and
the shutoff valve does not block the flow of recreational vehicle wastewater from the linearly slideable dump valve to the linearly slideable gate; and
the liquid level measuring module:
is located and configured to be responsive to the recreational vehicle wastewater tank liquid level,
does not require the use of an additional fluid having a higher density than the wastewater whose liquid level is being measured, and
is configured to entirely fit underneath of the floor of the recreational vehicle and inboard of the sidewalls of the recreational vehicle.

2. The system of claim 1, wherein:
the liquid level measuring apparatus inlet comprises exactly four bayonet receptors;
the liquid level measuring apparatus is configured for user attachment and detachment by a rotation of the apparatus of no more than 90 degrees to engage the four bayonet receptors with the wastewater outlet;
wherein the sight glass comprises a transparent hollow cylindrical section of rigid polyvinyl chloride pipe; and
the location of a liquid-to-air interface in the sight glass is responsive to the pressure of the liquid between the linearly slideable dump valve and the linearly slideable gate valve.

3. The system of claim 1 wherein:
the apparatus is configured for:
attachment to a wastewater outlet downstream of a plurality of linearly slideable dump valves; and
reading the wastewater level in more than one recreational vehicle wastewater tank while using only one liquid level measuring module; and
the liquid level measuring device comprises the mechanical pressure gage comprising:
a diaphragm wherein the diaphragm moves in response to liquid levels in a plurality of recreational vehicle wastewater tanks that are located: upstream of the liquid level measuring module; and upstream of the linearly slideable gate; and
the rotary dial that indicates a reading in inches of water in response to the movement of the diaphragm.

4. The apparatus of claim 1 wherein:
the liquid level measuring apparatus inlet comprises exactly four bayonet receptors;
connection of the liquid level measuring module to the apparatus inlet occurs at a point that is aligned at the same rotational angle as one of the bayonet receptors;
the liquid level measuring module further comprises a first angled adjustment fitting and a second angled adjustment fitting wherein:
the first angled adjustment fitting comprises exactly two ports that are oriented at a bent angle of at least 22.5 degrees from each other;
the first angled adjustment fitting is located between the top of the apparatus inlet and the second angled adjustment fitting;
the second angled adjustment fitting comprises exactly two ports that are oriented at a bent angle of at least 22.5 degrees from each other;
the second angled adjustment fitting is located:
between the first angled adjustment fitting and the shutoff valve;
below the shutoff valve; and
on the opposite side of the shutoff valve from where the liquid level measuring device is attached to the shutoff valve.

5. A recreational vehicle wastewater tank level measuring system comprising:
a user-detachable liquid level measuring apparatus configured for manual tool-free attachment and detachment to the outlet of a recreational vehicle wastewater tank, downstream of a linearly slideable dump valve that is located downstream of a recreational vehicle wastewater tank, the user-detachable liquid level measuring apparatus comprising:
an inlet;
an outlet;
a linearly slideable gate located between the inlet and the outlet;
an actuator for linearly sliding the gate; and
a liquid level measuring module, wherein the liquid level measuring module comprises:
a first end attached; proximate to the top of the apparatus inlet and upstream of the slideable gate;
a liquid level device selected from the group of comprises a sight glass, a mechanical pressure gage, and an air vent valve, wherein:
the device is located above the first end,
the mechanical pressure gage comprising a rotary dial to indicate pressure in response to a wastewater liquid level of the recreational vehicle tank,
the sight glass is located above a shutoff valve and between the shutoff valve and the air vent valve, and
the air vent valve is located above the sight glass and between the sight glass and the mechanical pressure gage; and
wherein:
the shutoff valve is located above the first end;
the shutoff valve is located between first end and the liquid level device;
the shutoff valve is configured for selectively preventing the flow of fluid between the first end and the liquid level device; and
the shutoff valve does not block the flow of recreational vehicle wastewater from the recreational vehicle wastewater tank outlet and the linearly slideable gate; and
the liquid level measuring module:
is located and configured to be responsive to the liquid level of a fluid upstream of the apparatus and downstream of the linearly slideable dump valve; and
is configured to entirely fit underneath of the floor of the recreational vehicle and inboard of the sidewalls of the recreational vehicle.

6. The system of claim 5 wherein:
the apparatus inlet comprises exactly four bayonet receptors;
the apparatus outlet comprises exactly four radial bosses;
the actuator further comprises a T-shaped handle;
the liquid level measuring module further comprises a first angled adjustment fitting, and a second angled adjustment fitting, wherein:

the first angled adjustment fitting comprises exactly two fluid connections:
a first angled adjustment fitting outlet, and
a first angled adjustment fitting inlet that are at an angle to that is bent at least 22.5 degrees from a straight through connection;
the first angled adjustment fitting is located between the apparatus inlet and the second angled adjustment fitting;
the second angled adjustment fitting comprises exactly two fluid connections:
a second angled adjustment fitting outlet, and
a second angled adjustment fitting inlet that are at an angle that is bent at least 22.5 degrees from a straight through connection;
the second angled adjustment fitting is located between the first angled adjustment fitting and the shutoff valve;
the first and second angled adjustment fittings can be rotated relative to each other to produce any angle between 0 and 45 degrees between the inlet of the first angled adjustment fitting and the outlet of the second angled adjustment fitting;
wherein the liquid level sight comprises a transparent hollow cylindrical section of rigid polyvinyl chloride pipe.

7. The system of claim 5 wherein:
the apparatus is configured for reading the wastewater level in more than one tank while using only one liquid level measuring module;
the liquid level measuring module further comprises:
a threaded fitting wherein the threaded fitting is threaded to the inlet of the apparatus; and
the sight glass further comprises a transparent hollow rigid cylindrical section configured for holding a liquid and visually displaying a liquid level.

8. The system of claim 5 wherein:
the sight glass comprises a transparent hollow rigid cylindrical section configured for holding a liquid and visually displaying a liquid level.

9. The system of claim 5 wherein:
the liquid level measuring apparatus is configured for user attachment and detachment by a manual tool-free rotation of the apparatus to engage the apparatus with the wastewater outlet;
the first end of the liquid level measuring module is attached to the apparatus inlet in a region proximate to the linearly slideable gate actuator;
the rotary dial is configured to indicate pressure in inches of water in response to a wastewater liquid level of the recreational vehicle tank:
upstream of the liquid level measuring module; and
upstream of the linearly slideable gate.

10. The system of claim 5 wherein:
the liquid level measuring apparatus is configured for detachment from the recreational vehicle wastewater tank outlet when the apparatus is not in use;
the apparatus inlet further comprises at least one bayonet receptor; and
the apparatus outlet further comprises at least one radial boss.

11. The system of claim 5 wherein:
the apparatus inlet comprises exactly four bayonet receptors;
the apparatus outlet comprises exactly four radial bosses; and closing of the shutoff valve will prevent recreational vehicle wastewater from sloshing in the apparatus when the recreational vehicle is in motion.

12. The system of claim 5 wherein:
the apparatus is configured for reading the level of a plurality of recreational vehicle wastewater tanks;
the liquid level measuring apparatus inlet comprises exactly four bayonet receptors;
connection of the liquid level measuring module to the apparatus inlet occurs at a point that is aligned at the same rotational angle as one of the bayonet receptors;
the liquid level measuring apparatus is configured for user attachment and detachment by a rotation of the apparatus of no more than 90 degrees to engage the four bayonet receptors with the wastewater outlet;
the liquid level measuring module further comprises a first angled adjustment fitting and a second angled adjustment fitting wherein:
the first angled adjustment fitting comprises exactly two fluid connections:
a first angled adjustment fitting outlet, and
a first angled adjustment fitting inlet that are at an angle that is bent at least 22.5 degrees from a straight through connection;
the first angled adjustment fitting is located between the apparatus inlet and the second angled adjustment fitting;
the second angled adjustment fitting comprises exactly two fluid connections:
a second angled adjustment fitting outlet, and
a second angled adjustment fitting inlet that are at an angle that is bent at least 22.5 degrees from a straight through connection;
the second angled adjustment fitting is located between the first angled adjustment fitting and the shutoff valve.

13. The system of claim 5 wherein:
the first end of the device comprises a threaded fitting;
the shutoff valve is located below the bottom of the recreational vehicle wastewater tank; and
the shutoff valve is opened and closed using a rotary motion.

14. The system of claim 5 wherein:
the apparatus inlet comprises a cylinder;
the bottom of the shutoff valve comprises a cylindrical section having an outside diameter that is less than one quarter of the outside diameter of the apparatus inlet; and
the shutoff valve connects to the apparatus inlet at the cylindrical section of the shutoff valve.

15. A method for displaying the liquid level in a wastewater tank of a recreational vehicle comprising the steps of:
establishing a user-detachable liquid level measuring apparatus that comprises:
a device comprises a sight glass and a mechanical pressure gage; and
a shutoff valve for the device that is located below the device;
placing an air vent valve between the shutoff valve and the mechanical pressure gape wherein the air vent valve is above the shutoff valve and below the mechanical pressure gage;
placing the sight glass between the shutoff valve and the air vent valve;
reading the level of the liquid indicated by the a rotary dial on the mechanical pressure gage;

locating the shutoff valve and the device above an inlet of the apparatus, wherein the apparatus further comprises:
an outlet;
a slideable gate located between the inlet and the outlet; and
an actuator for sliding the gate; and
removably attaching the apparatus to the outlet of the wastewater tank of the recreational vehicle in a configuration wherein:
the apparatus is attached downstream of a dump valve that is located downstream of the wastewater tank; and
the device entirely fits underneath the floor of the recreational vehicle inboard of the sidewalls of the recreational vehicle.

16. The method of claim 15 further comprising the steps of:
closing the sliding gate on the apparatus;
opening the shutoff valve;
opening a first dump valve upstream of the apparatus
reading the level of the liquid in a first wastewater tank as indicated by the device;
closing the first dump valve;
opening a second dump valve upstream of the apparatus; and
reading the level of the liquid in a second wastewater tank as indicated by the device.

17. The method of claim 15 wherein:
removably attaching comprises rotation of the liquid level measuring apparatus to engage four bayonet receptors on the apparatus to four pins on the recreational vehicle wastewater outlet wherein the rotation comprises an angle of no more than 90 degrees; and
the sight glass comprises a transparent rigid hollow cylindrical section configured for holding a liquid and visually displaying a liquid level.

18. The method of claim 15 wherein:
the rotary dial is graduated in inches of water; and
the method further comprises the step of removing the apparatus from the recreational vehicle wastewater tank outlet after the liquid level has been measured by the device.

19. The method of claim 15 further comprising the steps of:
closing the slideable gate;
opening the shutoff valve;
opening the dump valve that is downstream of the wastewater tank and upstream of the slideable gate;
opening the air vent valve;
observing an air to liquid interface in the sight glass;
closing the air vent valve when the air to liquid interface in the sight glass reaches the top.

* * * * *